(12) United States Patent
Saito

(10) Patent No.: US 8,905,593 B2
(45) Date of Patent: Dec. 9, 2014

(54) LUMINOUS FLUX CONTROL MEMBER AND LIGHT-EMITTING APPARATUS INCLUDING THE SAME

(75) Inventor: Tomohiro Saito, Kawaguchi (JP)

(73) Assignee: Enplas Corporation, Kawaguchi-Shi (JP)

( * ) Notice: Subject to any disclaimer, the term of this patent is extended or adjusted under 35 U.S.C. 154(b) by 288 days.

(21) Appl. No.: 13/601,735

(22) Filed: Aug. 31, 2012

(65) Prior Publication Data

US 2013/0063950 A1   Mar. 14, 2013

(30) Foreign Application Priority Data

Sep. 9, 2011   (JP) .................. 2011-196987

(51) Int. Cl.
| | |
|---|---|
| F21V 13/04 | (2006.01) |
| G02B 19/00 | (2006.01) |
| F21V 5/02 | (2006.01) |
| F21V 7/00 | (2006.01) |
| F21Y 101/02 | (2006.01) |
| F21V 3/04 | (2006.01) |

(52) U.S. Cl.
CPC .............. F21V 5/02 (2013.01); G02B 19/0061 (2013.01); *F21V 7/0091* (2013.01); G02B 19/0028 (2013.01); *F21Y 2101/02* (2013.01); *F21V 3/04* (2013.01); G02B 19/0009 (2013.01)
USPC ............................ 362/309; 362/308; 362/334

(58) Field of Classification Search
USPC ........................... 362/307, 308, 309, 333, 334
See application file for complete search history.

(56) References Cited

U.S. PATENT DOCUMENTS

2002/0015231 A1* 2/2002 Ogawa ......................... 359/566
2011/0019404 A1   1/2011 Chen et al.

FOREIGN PATENT DOCUMENTS

JP   2011-029168 A1   2/2011

* cited by examiner

*Primary Examiner* — David V Bruce
(74) *Attorney, Agent, or Firm* — Law Office of Katsuhiro Arai

(57) ABSTRACT

A luminous flux control member that controls travelling direction of light emitted from a light source includes an incident area, an emission area, and a plurality of projecting sections. The plurality of projecting sections are constituted by an inner area, an intermediate area, and a peripheral area defined in the radial direction, and a first specific projecting section disposed in the inner area is configured such that a planar section that is used to measure the height of the first specific projecting section and is perpendicular to the optical axis is connected to an inner peripheral end and an outer peripheral end of a base end portion of the first specific projecting section. The projecting sections other than the first specific projecting section, in principle, come into contact internally or externally with another projecting section other than the first specific projecting section.

9 Claims, 9 Drawing Sheets conventional
product 1'
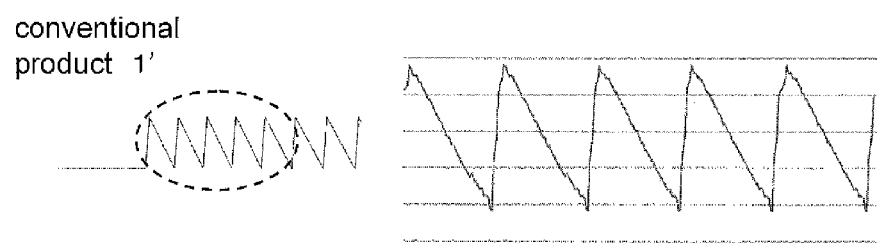
FIG. 1 1 A
product of the
present invention 1
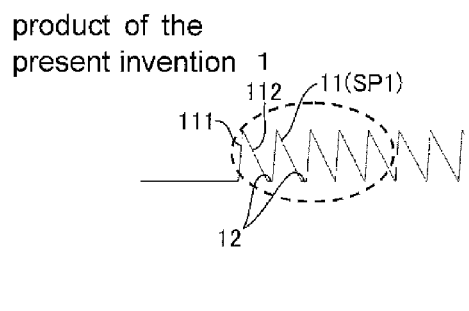
FIG. 1 1 B

LUMINOUS FLUX CONTROL MEMBER AND LIGHT-EMITTING APPARATUS INCLUDING THE SAME

TECHNICAL FIELD

The present invention relates to a luminous flux control member and a light-emitting apparatus including the luminous flux control member. In particular, the present invention relates to a luminous flux control member and a light-emitting apparatus including the luminous flux control member suitable for controlling the traveling direction of light emitted from a light source.

BACKGROUND ART

As a luminous flux control member that controls the traveling direction of light emitted from a light source, a luminous flux control member (so-called Fresnel lens) has been conventionally used that has a serrated cross-sectional shape (referred to, hereinafter, as a Fresnel shape) in which a light-incident area and a light-emission area are divided into a plurality of concentric ring-shaped (circular band-shaped) segmented areas. Because this luminous flux control member is suitable for reducing thickness and weight and the like, it is used for various purposes (such as in magnifying glasses and lighting systems).

When this type of luminous flux control member is assembled into a product for illumination, for example, a light source, such as a light-emitting diode (LED), is fixed to the incident area side formed into the Fresnel shape after positioning is performed such that the center axis of light emitted from the light source is coaxially aligned with the optical axis of the luminous flux control member.

In addition, the Fresnel shape of this type of luminous flux control member includes a type having only a refraction surface that refracts light emitted from a light source and a type having a total reflection surface in addition to the refraction surface. The latter type is more advantageous than the former type in terms of efficiently capturing and converging light emitted from the light source (such as an LED) at a wide spread angle.

Specifically, the LED which is an example of a light source emits light having a wide spread angle and light distribution characteristics based on so-called Lambertian distribution. To effectively use this light for illumination and the like, the market requires the light distribution characteristics of the light to be narrowed by the luminous flux control member and the directivity of the light to be improved. Therefore, when the Fresnel shape including only the refraction surface is used to change the light emitted from the LED to light having a narrow-angle light distribution, the amount of change in the traveling direction of light in the incident area of the luminous flux control member is determined only by refraction by the refraction surface. Therefore, no significant change appears in the traveling direction of light transmitted within the luminous flux control member in relation to the traveling direction (original traveling direction) of light at the time of incidence onto the luminous flux control member. Therefore, in particular, light emitted from the LED towards the wide-angle side cannot be sent toward a target irradiated surface by refraction, and spreading of the overall light (light beam) cannot be sufficiently suppressed. On the other hand, when the Fresnel shape including the total reflection surface is used, the light entering the luminous flux control member from the refraction surface can be totally reflected by the total reflection surface and the traveling direction can be significantly changed. Therefore, even light emitted from the LED toward the wide-angle side can be sent towards the irradiated surface side.

Therefore, the Fresnel shape including the total reflection surface is suitable for luminous flux control. However, conversely, the tip portion (top portion) of a projecting section configuring the Fresnel shape becomes sharp due to the total reflection surface, and production tends to be difficult.

For example, when the luminous flux control member is obtained by injection molding, the sharper the tip portion of the projecting section of the Fresnel shape is, the more difficult it is to fill the feature replication surface for the projecting section of the mold with a resin material. Therefore, a molding defect easily occurs in which the edge of the tip portion is not formed due to insufficient filling.

In reflection of this difficulty in production, the sharp Fresnel shape including the total reflection surface requires shape management that is stricter than that for the Fresnel shape including only the refraction surface. Management of height of the projecting section (length from a base end portion to a tip portion) is particularly important.

Here, when the height of the projecting section of the Fresnel shape is measured as part of such shape management, in the instance of a common Fresnel shape including only the refraction surface, the difference between the tip portion and the base end portion of the projecting section of the Fresnel shape can be checked and the height can be accurately determined, by the Fresnel shape being traced while light is shone onto the surface of the Fresnel shape by a general-purpose measuring device, such as a tool microscope or a laser microscope, and reading the position at which focus is achieved.

On the other hand, in the instance of the Fresnel shape including the total reflection surface, the height of the projecting section cannot be accurately measured by a general-purpose measuring device. In the Fresnel shape including the total reflection surface, not only is the tip portion of the projecting section sharp, as described above, in the valley shape formed between adjacent projecting sections, the valley bottom in which the periphery of the base end portion of the projecting section is positioned tends to have a sharp acute angle. Even when light from the measuring device is shone onto the valley bottom formed by such steep inclined surfaces, noise occurs and an accurate focal position (periphery of the base end portion of the projecting section) cannot be read.

Therefore, for shape management of the Fresnel shape including the total reflection surface, measurement of the projecting section may be abandoned and the optical characteristics of the luminous flux control member itself may be evaluated instead. Because the purpose of the luminous flux control member is to achieve desired optical characteristics, such direct evaluation of optical characteristics is a highly reliable product inspection method.

However, a dedicated evaluation device is required for evaluation of optical characteristics. Time is also required for carrying out measurement. Therefore, a problem occurs in that cost increases and inspection efficiency decreases.

Here, in Patent Literature 1, a configuration is disclosed in which a planar section that is perpendicular to the optical axis is provided between projecting sections that are adjacent to each other in the radial direction in the Fresnel shape. A planar section such as this does not change in shape in the height direction and has a certain amount of area. Therefore, optical readout by a general-purpose measuring device can be appropriately performed. Thus, when the planar section is used as reference for the height of the projecting section (in other words, a zero-height position that is at the same height as the base end portion of the projecting section), the height of the projecting section can be simply and accurately measured.

Patent Literature 1: Japanese Patent Laid-open Publication No. 2011-29168

DISCLOSURE OF INVENTION

Problem to be Solved by the Invention

However, in the configuration described in Patent Literature 1, the planar section that does not perform luminous flux control based on the Fresnel shape is provided between all projecting sections. Therefore, a disadvantage arises in that the light passing through the planar sections become unwanted light (stray light) and optical characteristics deteriorate.

On the other hand, in the luminous flux control member having the Fresnel shape in the incident area, a configuration has sometimes been used since the past in which the number of projecting sections on the peripheral side is culled, from the perspective of simplifying the product shape (mold shape) and the like. This takes into consideration that fact that, based on a relationship with the emission angle of light from the LED, the closer the projecting section is to the peripheral side (outer side in the radial direction), the more prone the other projecting section adjacent thereto on the center side (inner side in the radial direction) is to becoming a light blocking object and restricting the amount of incident light from the LED. In a configuration such as this, for example, to allow light from the LED that has passed between an arbitrary pair of projecting sections having a positional relationship adjacent to each other on the peripheral side, such as to graze the tip portion of the projecting section on the inner side, to be incident near the base end portion of the projecting section on the outer side, a gap section is provided between both projecting sections. As a result, a layout is achieved in which the projecting sections that have up to now been disposed in the positions equivalent to the gap sections can be eliminated. In a configuration such as this, as a result of the projecting sections on the peripheral side being culled, the planar sections may be secondarily formed in the culled areas (gap sections).

In this configuration, the planar sections can, as a result, be disposed such as to be limited to the projecting sections on the peripheral side. Therefore, compared to instances in which a large number of planar sections are used, as described in Patent Literature 1, deterioration of optical characteristics can be suppressed.

However, in the Fresnel shape including the total reflection surface, the tip portion tends to be sharper in the projecting sections on the center side compared to those of the projecting sections on the peripheral side, based on a relationship with the emission angle of light emitted from the light source and the accompanying incidence direction of the light on the total reflection surface, and the like. Therefore, the importance of shape management applies to the projecting sections on the center side rather than the projecting sections on the peripheral side.

Therefore, in the Fresnel shape including the total reflection surface, a configuration in which the planar sections are disposed such as to be limited to the peripheral side, as described above, is unsuitable from the perspective of shape management of the projecting sections.

On the other hand, as described earlier, it should be kept in mind that indiscriminately providing the planar sections is not preferred from the perspective of optical characteristics. This further applies to the reflection-type Fresnel shape of which the intended purpose is to achieve more favorable optical characteristics compared to the refraction-type Fresnel shape.

Therefore, the present invention has been achieved in light of the above-described issues. An object of the present invention is to provide a luminous flux control member and a light-emitting apparatus including the luminous flux control member capable of performing shape management of projecting sections that have steep inclined surfaces and are highly difficult to measure, in a simple, efficient, and inexpensive manner, with minimal sacrifice of optical characteristics.

Means for Solving Problem

To achieve the above-described object, a luminous flux control member according to a first aspect of the present invention controls traveling direction of light emitted from a light source and includes: an incident area on which light emitted from the light source is incident; an emission area that emits light that has entered the incident area; and a plurality of projecting sections that are formed in the incident area, have a concentric circular ring shape of which the center is an optical axis when viewed from the optical axis direction, and are arrayed in a radial direction such as to form a serrated shape in a cross-section including the optical axis. The projecting sections are formed such that a first surface disposed on the inner side in the radial direction has a smaller angle in relation to the optical axis than a second surface disposed on the outer side in the radial direction. The second surface functions as a total reflection surface that totally reflects the light that has reached the second surface from the light source in a predetermined traveling direction. When the plurality of projecting sections are classified into an inner area, an intermediate area, and a peripheral area for each position in the radial direction, a first specific projecting section disposed in the inner area is configured such that a planar section that is used to measure the height of the first specific projecting section and is perpendicular to the optical axis is connected to an inner peripheral end of a base end portion and an outer peripheral end of the base end portion of the first specific projecting section. The projecting sections other than the first specific projecting section, among the plurality of projecting sections, are, in principle, disposed such as to come into contact internally or externally with another projecting section other than the first specific projecting section.

In the invention according to the first aspect, the planar section is, in principle, restrictively disposed in a position coming to contact internally or externally with the peripheral end of the base end portion of the first specific projecting section belonging to (disposed in) the inner area. Therefore, among the plurality of projecting sections including steep inclined surfaces, the height of the first specific projecting section, of which the importance of shape management is particularly high, can be preferentially measured. On the other hand, as a result of the number of planar sections being minimized, deterioration of optical characteristics attributed to the planar sections can be suppressed.

In addition, a luminous flux control member according to a second aspect is the luminous flux control member according to the first aspect in which, further, the first specific projecting section is a projecting section adjacent, on the outer side in the radial direction, to a projecting section disposed furthest inward in the radial direction.

In the invention according to the second aspect, as a result of the projecting section of which the importance of shape management is the highest being selected as the first specific projecting section, optimization of shape management can be achieved.

Furthermore, a luminous flux control member according to a third aspect is the luminous flux control member according to the first aspect in which, further, a second specific projecting section disposed in the peripheral area, among the projecting sections other than the first specific projecting section, is configured such that, as an exception, a planar section that is used to measure the height of the second specific projecting section and is perpendicular to the optical axis is connected to the inner peripheral end of the base end portion and the outer peripheral end of the base end portion of the second specific projecting section.

In the invention according to the third aspect, as a result of the planar section being additionally disposed, as an exception, in a position coming to contact internally or externally with the peripheral end of the base end portion of the second specific projecting section belonging to (disposed in) the outer area, measurement accuracy of the height of the projecting section can be improved while minimizing the number of planar sections that are added.

Still further, a luminous flux control member according to a fourth aspect is the luminous flux control member according to the third aspect in which, further, the second specific projecting section is a projecting section disposed furthest outward in the radial direction.

In the invention according to the fourth aspect, as a result of one of the projecting sections that are the easiest to confirm being selected as the second specific projecting section, handling can be improved.

In addition, a luminous flux control member according to a fifth aspect is the luminous flux control member according to any one of the first to fourth aspects in which, further, the planar section is formed such that the width in the radial direction is 5 µm or more and less than 20 µm.

In the invention according to the fifth aspect, the planar section can be formed in a size that is sufficiently small in terms of the limit allowing optical readout by a general-purpose measuring device. Therefore, deterioration of optical characteristics attributed to the planar sections can be more effectively suppressed, while ensuring simplification, efficiency, and economic efficiency of shape management of the projecting sections.

Furthermore, a light-emitting apparatus according to a sixth aspect includes: a luminous flux control member according to the first aspect; and a light source according to the first aspect that is disposed opposing the incident area of the luminance flux control member.

In the invention according to the sixth aspect, among the plurality of projecting sections including steep inclined surfaces, the height of the first specific projecting section, of which the importance of shape management is particularly high, can be preferentially measured. In addition, deterioration of optical characteristics attributed to the planar sections can be suppressed.

Effect of the Invention

In the present invention, shape management of projecting sections that have steep inclined surfaces and are highly difficult to measure can be performed in a simple, efficient, and inexpensive manner, with minimal sacrifice of optical characteristics.

BRIEF DESCRIPTION OF DRAWINGS

FIG. 11A and FIG. 11B show diagrams of the results of projecting section shape readout for shape management performance evaluation together with a corresponding projecting section shape, in an example of the present invention.

BEST MODE(S) FOR CARRYING OUT THE INVENTION

An embodiment of a luminous flux control member and a light-emitting apparatus including the luminous flux control member of the present invention will be described with reference to FIG. 1 to FIG. 17.

Figure 1:
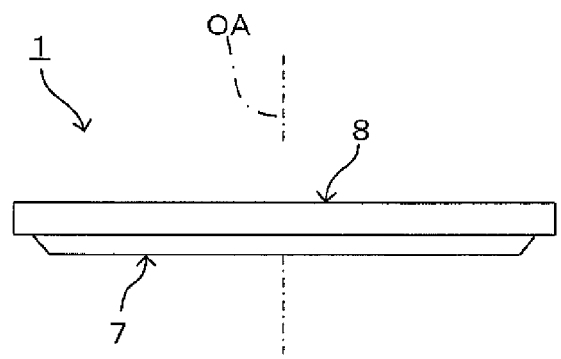
FIG. 1 shows a front view of a luminous flux control member according to an embodiment of the present invention.
Figure 2:
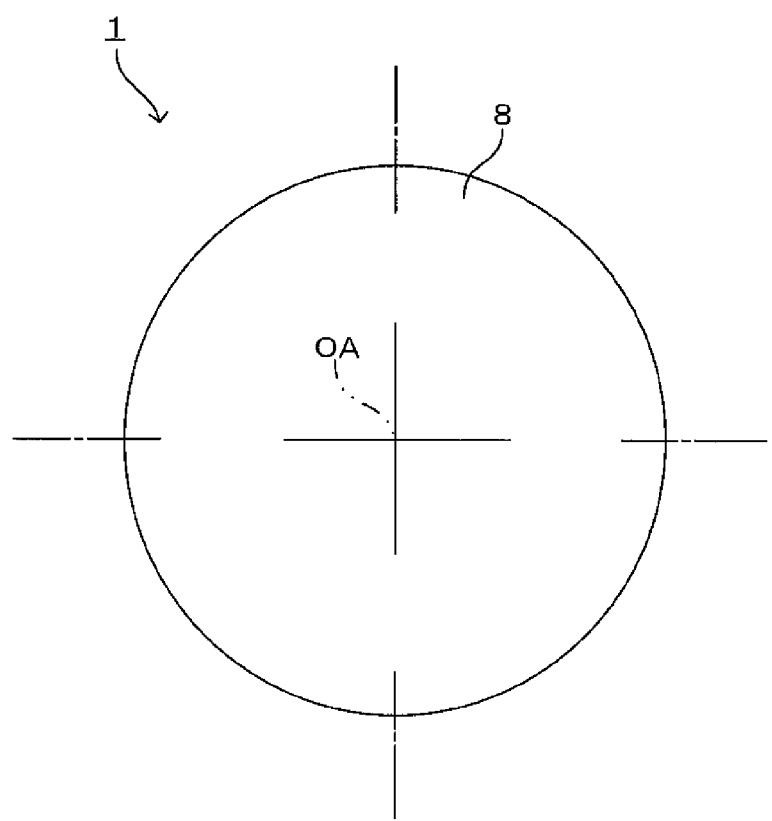
FIG. 2 shows a planar view of FIG. 1.
Figure 3:
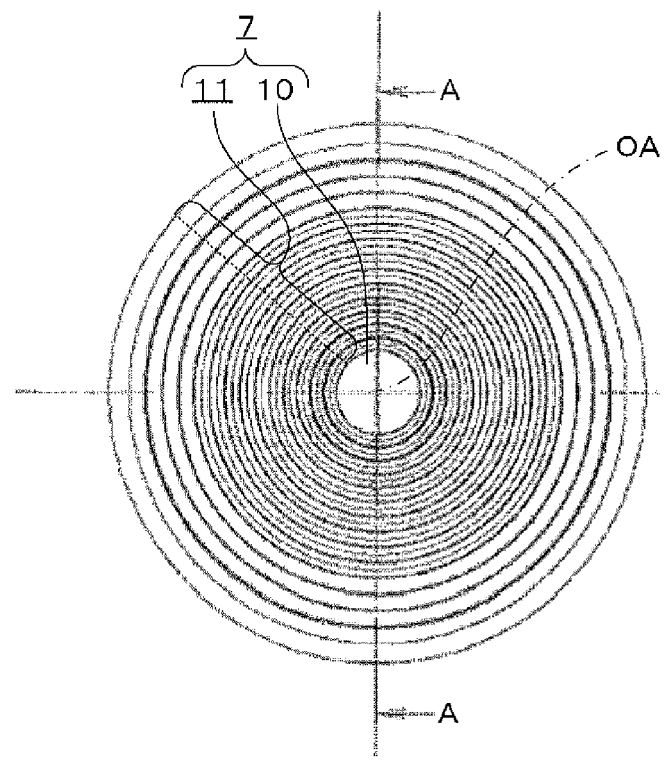
FIG. 3 shows a bottom view of FIG. 1.
Figure 4:
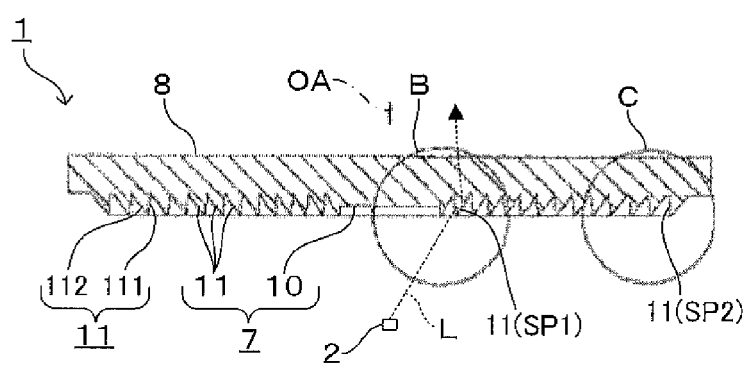
FIG. 4 shows a schematic configuration diagram of a light-emitting apparatus of the present invention in which a cross-sectional view taken along A-A in FIG. 2 is shown together with a light source.
Figure 5:
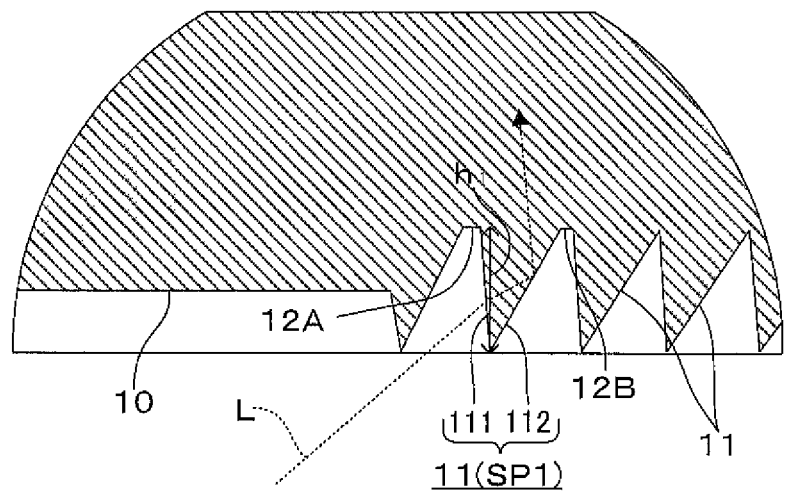
FIG. 5 shows an enlarged view of frame B in FIG. 4.
Figure 6:
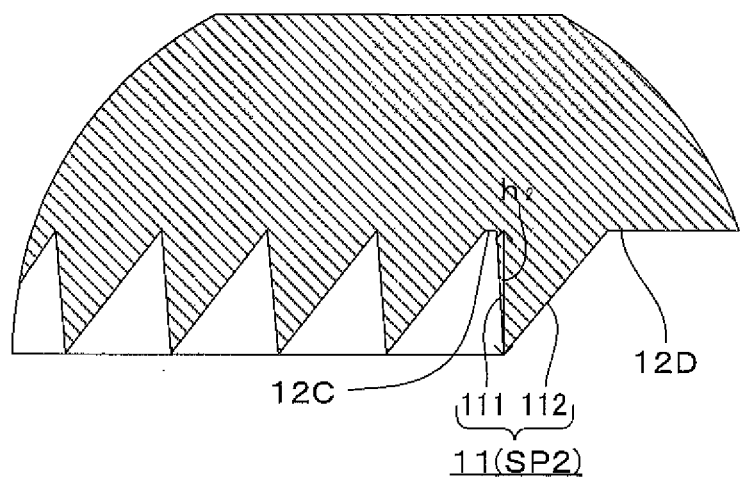
FIG. 6 shows an enlarged view of frame C in FIG. 4.

Here, FIG. 1 is a front view of a luminous flux control member 1 according to the present embodiment. FIG. 2 is a planar view of FIG. 1. FIG. 3 is a bottom view of FIG. 1. FIG. 4 shows a cross-sectional view taken along line A-A in FIG. 2 together with a light source 2 and is equivalent to a schematic configuration diagram of a light-emitting apparatus 3 according to the present embodiment. FIG. 5 is an enlarged view of frame B in FIG. 4. FIG. 6 is an enlarged view of frame C in FIG. 4.

The luminous flux control member 1 according to the present embodiment is configured by a circular disk-shaped luminous flux control section 4 including an optical axis OA involved with control of luminous flux and a circular cylindrical edge section 5 surrounding the luminous flux control section 4, as shown in FIG. 1. The luminous flux control member 1 can be integrally formed using a mold by injection molding or the like, using a transparent resin material, such as poly(methyl methacrylate) (PMMA), polycarbonate (PC), cyclo olefin polymer (COP) resin, epoxy (EP) resin, or silicone resin.

The luminous flux control section 4 has two luminous flux control surfaces 7 and 8, which are an incident area 7 and an emission area 8 that opposing each other in the optical axis OA direction, as shown in FIG. 1.

Here, light L (luminous flux) emitted from a light source 2 (light-emitting element), such as an LED, disposed in a position opposing the incident area 74 on the optical axis OA is incident on the incident area 7, as shown in FIG. 4. However, the light source 2 is configured to emit the light L having a predetermined spread angle in relation to the optical axis CA direction towards the luminous flux control member 1 side. In addition, the center axis of the light L emitted from the light source L matches the optical axis OA of the luminous flux control member 1. In FIG. 1, only the optical path of the light L emitted from a single light emission point on the optical axis OA of the light source 2 is shown (a single representative light ray within the light beam is shown). However, in actuality, surface light-emission is performed by the overall light source 2.

On the other hand, the light L from the light source 2 that has entered the incident area 7 is transmitted into the light beam control section 4, and irradiated from the inner side of the light beam control section 4 onto the emission area 8 (internal irradiation). The internally irradiated light L is emitted from the emission area 8 towards the irradiated surface side.

The incident area 7 and the emission area 8 will be described in further detail. The incident area 7 includes a flat center section 10 having a circular shape, of which the optical axis OA is the center in the bottom view (FIG. 3), and a plurality of projecting sections 11 concentrically surrounding the center section 10, as shown in FIG. 1. On the other hand, the emission area 8 is formed into a flat surface having a circular shape with a larger diameter than the center section 10, of which the optical axis OA is the center in the planar view (FIG. 2).

Here, as shown in FIG. 1, the plurality of projecting sections 11 are arrayed in the radial direction (horizontal direction in FIG. 1, as shown in FIG. 1. In addition, when viewed from the optical axis OA direction (in the bottom view) as shown in FIG. 3, each projecting section 11 has a concentric circular ring shape (circular band shape) of which the center is the optical axis OA. In addition, the projecting sections 11 form a serrated shape in a cross-section including the optical axis OA, as shown in FIG. 4, and form a Fresnel shape as a whole.

As shown in an enlarged cross-sectional view in FIG. 5 and FIG. 6, each projecting section 11 has a first surface 111 and a second surface 112 that serves as a total reflection surface and is formed in a position on the outer side in the radial direction with reference to the optical axis OA (inner end in the radial direction) in relation to the first surface 111. Here, the first surface 111 is formed into an inclined surface (tapered surface) of which the optical axis OA is the center axis and that has a predetermined acute tilt angle in relation to the optical axis OA such as to tilt towards the side (outer side in the radial direction) opposite to the optical axis OA towards the light source 2 side (bottom side in FIG. 5 and FIG. 6). On the other hand, the second surface 112 is formed into an inclined surface (tapered surface) of which the optical axis OA is the center axis and that has a predetermined acute tilt angle in relation to the optical axis OA such as to tilt towards the optical axis OA side (inner side in the radial direction) towards the light source 2 side. The first surface 111 and the second surface 112 are connected to each other at the respective tip portions (lower end portions in FIG. 5 and FIG. 6). The first surface 111 is formed having a smaller angle in relation to the optical axis OA than the second surface 112.

Here, the light L emitted from the light source 2 is incident on the first surface 111 and the incident light L is refracted to the second surface 112 side by the first surface 111, as shown in FIG. 5 and FIG. 6.

On the other hand, the light L from the light source 2 that has been refracted by the first surface 111 is internally incident on the second surface 112 at a larger angle of incidence than the critical angle from the inner side of the projecting section 111, and the internally incident light L is totally reflected towards the emission area 8 side, or in other words, the irradiated surface side by the second surface 112, as shown in FIG. 5 and FIG. 6.

Because the second surface 112 is formed in a rotationally symmetrical shape with the optical axis OA as the axis of symmetry, a cone-shaped (conical) light of which the center is the optical axis OA is emitted from the overall second surface 112.

The light that has been totally reflected by the second surface 112 in this way reaches the emission area 8 and is emitted towards the irradiated surface from the emission area 8.

Furthermore, as a comparison of FIG. 5 and FIG. 6 clearly shows, according to the present embodiment, the projecting sections 11 (FIG. 5) disposed relatively closer to the inner side in the radial direction are formed having a sharper tip portion (lower end portion) (in other words, a smaller narrow angle between the first surface 111 and the second surface 112) than the projecting sections 11 (FIG. 6) disposed relatively closer to the outer side in the radial direction. The projecting sections 11 may be configured such that the sharpness of the tip portion gradually increases towards the inner side in the radial direction. Alternatively, the projecting sections may be configured such that the sharpness of the tip portion increases in stages at every plurality of projecting sections 11. Here, an example of the angle of the tip portion (apex angle) of the projecting section 11 (FIG. 5) disposed on the inner side in the radial direction is 35°. A breakdown of the angle may be a tilt angle of 5° in relation to the optical axis OA direction of the first surface 111 in the cross-sectional view in FIG. 5, and a tilt angle of 30° in relation to the optical axis OA direction of the second surface 112 in the same drawing. In addition, an example of the angle of the tip portion of the projecting section 11 (FIG. 6) disposed on the outer side in the radial direction is 45°. A breakdown of the angle may be a tilt angle of 5° in relation to the optical axis OA direction of the first surface 111 in the cross-sectional view in FIG. 6, and a tilt angle of 40° in relation to the optical axis OA direction of the second surface 112 in the same drawing.

Still further, among the projecting sections 11, the projecting section 11 (SP1) adjacent on the outer side in the radial direction to the projecting section 11 disposed furthest inward in the radial direction (in other words, the second projecting section from the inner side) is a first specific projecting section 11 (SP1), as shown in FIG. 5. When the positions in the radial direction are classified into an inner area that is furthest inward, a peripheral area that is furthest outward, and an intermediate area that is between the inner area and the peripheral area, the first specific projecting section 11 (SP1) belongs to the inner area. In a typical example of classification into the three areas, the projecting sections 11 are evenly divided into three in the radial direction (for example, 5 to each area when the total number of projecting sections 11 is 15) and can be classified into the inner area, the intermediate area, and the peripheral area in order from the inner side. When classification such as this is performed, if the projecting sections 11 cannot be evenly divided into three, classification in accordance with equal division into three can be performed (such as 5 to two areas and 6 to one area, when the total number of projecting sections 11 is 16).

A first planar section 12A for measuring height h (1) of the first specific projecting section 11 (SP1) is connected (internal contact) to the inner peripheral end of the base end portion (upper end portion in FIG. 5) of the first specific projecting section 11 (SP1), as shown in FIG. 5. The first planar section 12A extends towards the inner side in the radial direction. More specifically, the first planar section 12A is formed into a circular ring-shaped flat surface that is concentric with the optical axis OA such as to be perpendicular to the optical axis OA direction, and makes contact externally with the innermost projecting section 11. In addition, a second planar section 12B for measuring the height h (1) of the first specific projecting section 11 (SP1), in a manner similar to the first planar section 12A, is connected (external contact) to the outer peripheral end of the base end portion (upper end portion in FIG. 5) of the first specific projecting section 11 (SP1), as shown in FIG. 5. The second planar section 12B extends towards the outer side in the radial direction. More specifically, the second planar section 12B is formed into a circular ring-shaped flat surface that is concentric with the optical axis OA such as to be perpendicular to the optical axis OA direction, and makes contact internally with the projecting section 11 adjacent to the first specific projecting section 11 (SP1) on the outer side in the radial direction. Furthermore, the first planar section 12A and the second planar section 12B have a coplanar positional relationship.

In addition, according to the present embodiment, the projecting sections 11 other than the first specific projecting section 11 (SP1), among the projecting sections 11, in principle (in other words, excluding a second specific projecting section 11 (SP2), described hereafter, as an exception), are disposed such as to come into contact internally or externally with another projecting section 11 (projecting sections 11 other than the first projecting section 11 (SP1)).

According to a configuration such as this, the planar sections 12A and 12B are, in principle, restrictively disposed in positions making contact internally or externally with the first specific projecting section 11 (SP1) disposed in the inner area. Therefore, among a plurality of projecting sections 11 including steep surfaces having a small angle in relation to the optical axis OA, the height of the first specific projecting section 11 (SP1), of which the importance of shape management in accompaniment with difficulty in formation attributed to the sharp angle is particularly high, can be preferentially measured. Regarding projecting sections 11 other than the first specific projecting section 11 (SP1), basically, the height can be considered accurate without measurement if the height of the first specific projecting section 11 (SP1) of which formation is the most difficult is accurate. On the other hand, as a result of the number of planar sections 12A and 12B being minimized, the occurrence of unwanted light caused by the planar sections 12A and 12B can be suppressed. Furthermore, as a result of the projecting section 11 that is the second from the inner side and of which the importance of shape management is the highest being selected as the first specific projecting section 11 (SP1), optimization of shape management can be achieved. Here, the innermost projecting section 11 is in contact internally with the flat center section 10. Therefore, despite the angle of sharpness angle being high, the projecting section 11 can be relatively easily formed.

In addition to the above-described configuration, according to the present invention, the projecting section 11 (SP2) disposed furthest outward in the radial direction among the projecting sections 11 serves as the second specific projecting section (SP2), as shown in FIG. 6. The second specific projecting section 11 (SP2) belongs to the peripheral area among the three areas (inner area, intermediate area, and peripheral area).

A third planar section 12C for measuring height h (2) of the second specific projecting section 11 (SP2) is connected (internal contact) to the inner peripheral end of the base end portion of the second specific projecting section 11 (SP2), as shown in FIG. 6. The third planar section 12C extends towards the inner side in the radial direction. More specifically, the third planar section 12C is formed into a circular ring-shaped flat surface that is concentric with the optical axis OA such as to be perpendicular to the optical axis OA direction, and makes contact externally with the projecting section 11 that is the second from the outer side in the radial direction. In addition, a fourth planar section 120 for measuring the height h (2) of the second specific projecting section 11 (SP2), in a manner similar to the third planar section 12C, is connected (external contact) to the outer peripheral end of the base end portion (upper end portion in FIG. 5) of the second specific projecting section 11 (SP2), as shown in FIG. 6. The fourth planar section 12D extends towards the outer side in the radial direction. More specifically, the fourth planar section 12D is formed into a circular ring-shaped flat surface that is concentric with the optical axis OA such as to be perpendicular to the optical axis OA direction and is configured by the end surface of the edge section 5. Furthermore, the third planar section 12C and the fourth planar section 12D have a coplanar positional relationship. The third planar section 12C and the fourth planar section 12D also have a coplanar relationship with the first planar section 12A and the second planar section 12B.

According to a configuration such as this, the planar sections 12C and 12D are additionally disposed, as exceptions, in positions coming into contact internally or externally with the peripheral end of the base end portion of the second specific projecting section 11 (SP2) disposed in the peripheral area. Therefore, the measurement accuracy of the height of the projecting section 11 can be improved while minimizing the number of planar sections 12C and 12D that are added. In addition, as a result of one of the projecting sections 11 that are the easiest to confirm being selected as the second specific projecting section 11 (SP2), handling can be improved.

Furthermore, according to a preferred embodiment, the width in the radial direction of the planar surfaces 12A to 12D is 5 μm or more and less than 20 μm. More preferably, the width of the planar surfaces 12A to 12D is 10 μm.

According to a configuration such as this, the planar sections 12A to 12D can be formed in a size that is sufficiently small in terms of the limit allowing optical readout by a general-purpose measuring device. Therefore, deterioration of optical characteristics attributed to the planar sections can be more effectively suppressed, while ensuring simplification, efficiency, and economic efficiency of shape management of the projecting sections 11.

The present invention can be applied to various variation examples in addition to the above-described basic configuration.

First Variation Example

Figure 7:
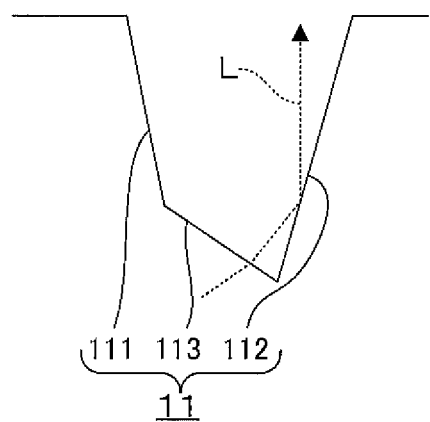
FIG. 7 shows an enlarged view of main sections showing a first pattern in a first variation example of the present invention.
Figure 8:
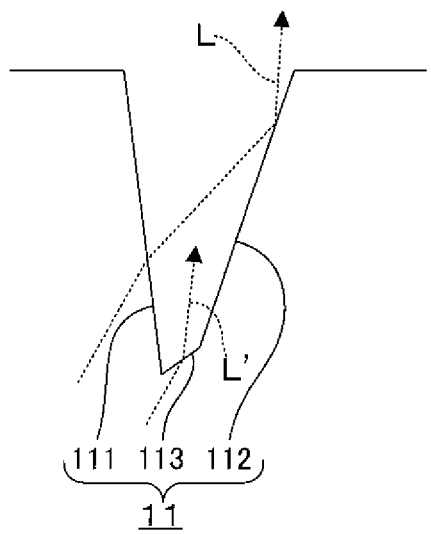
FIG. 8 shows an enlarged view of main sections showing a second pattern in the first variation example.

For example, as the projecting section 11, a projecting section 11 that includes a third surface 113 connecting the tip portion of the first surface 111 and the tip portion of the second surface 112, as shown in FIG. 7 and FIG. 8, may be used. Here, the third surface 113 in FIG. 7 is an inclined surface (tapered surface) that is tilted towards the side (outer side in the radial direction) opposite to the optical axis OA towards the light source 2 side. The third surface 113 functions to perform incidence and refraction of the light L from the light source 2 towards the second surface 112. On the other hand, the third surface 113 in FIG. 8 is an inclined surface (tapered surface) that is tilted towards the optical axis OA side towards the light source 2 side. The third surface 113 functions to refract incident light L' from the light source 2 towards the emission area 8 side.

In the projecting section 11 of the first variation example, in relation to the projecting section 11 of the basic configuration shown in FIG. 4 to FIG. 6, the sharpness of the tip portion is relaxed, and formation is relatively easy. However, the issue of difficulty in shape management that is characteristic of the reflection-type, in which readout of the peripheral end of the base end portion of the projecting section using an existing measuring device is difficult because the valley section between adjacent projecting sections 11 is sharp, still remains. Therefore, application of the present invention is greatly advantageous.

Second Variation Example

Figure 9:
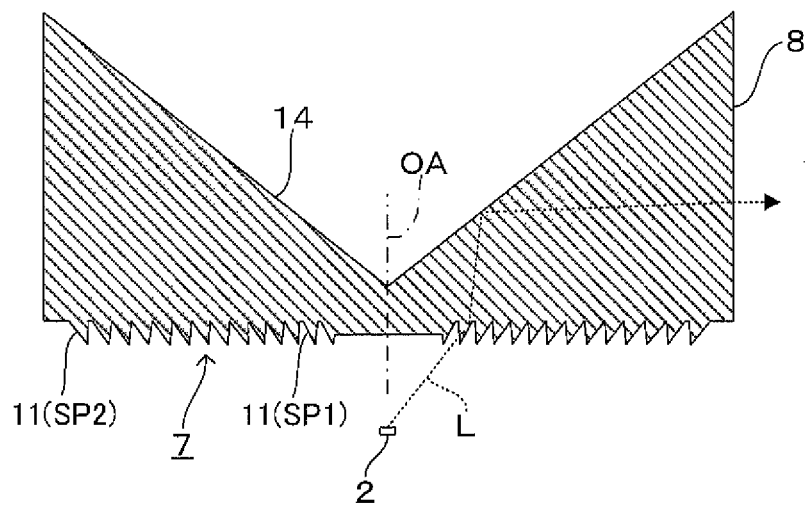
FIG. 9 shows a configuration diagram of a first pattern in a second variation example of the present invention.

The layout of the emission area 8 is changed from that of the basic configuration (FIG. 4), and a total reflection surface 14 is disposed in a position opposing the incident area 7 in the optical axis OA direction, as shown in FIG. 9. The total reflection surface 14 has a V-shaped refraction interface shape (plane symmetrical shape) of which a plane including the optical axis OA is the plane of symmetry, or an inverted conical shape (rotationally symmetrical shape) of which the optical axis OA as the axis of symmetry. The emission area 8 may be disposed on the light total reflection direction side in relation to the total reflection surface 14. The total reflection surface 14 may be moderately curved to more effectively ensure an angle of incidence of the light from the light source 2 that is larger than the critical angle.

According to a configuration such as this, the light L from the light source 2 is totally reflected laterally by the total reflection surface 14 after entering the incident area 7, and is emitted laterally from the emission area 8.

Figure 10:
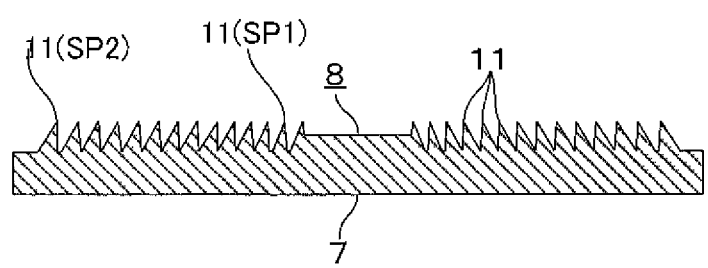
FIG. 10 shows a configuration diagram of a second pattern in the second variation example.
Figure 12:
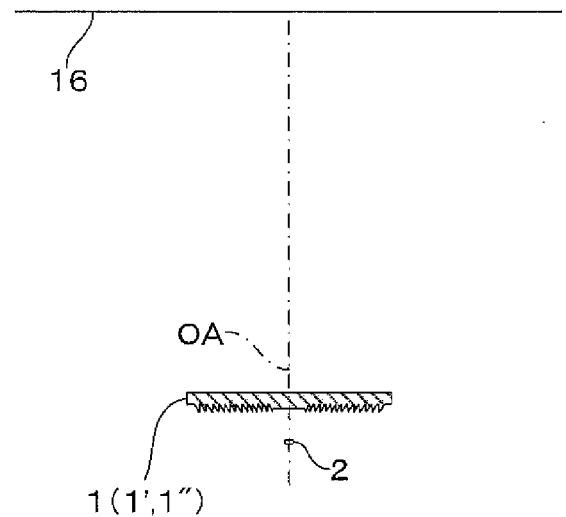
FIG. 12 shows an explanatory diagram for describing conditions of irradiated surface illuminance simulation for optical performance evaluation, in the example of the present invention.
Figures 13A, 13B:
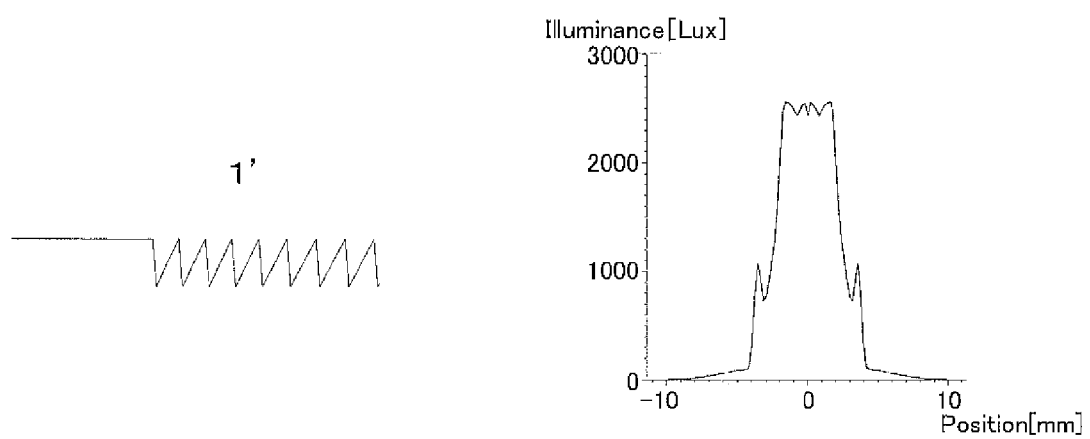
FIG. 13 shows a diagram of the results of irradiated surface illuminance simulation for a conventional product (FIG. 13B), together with a corresponding projecting section shape (FIG. 13A), in the example of the present invention.

Furthermore, the projecting sections 11 in which the planar sections 12 are disposed based on the same conditions as those of the basic configuration may be formed in the emission area 8, as shown in FIG. 10.

EXAMPLES

Next, in the present example, performance evaluation of the luminous flux control member 1 of the present invention (product of the present invention) was performed with comparison to a conventional luminous flux control member 1' (conventional product) or a luminous flux control member 1" (comparison product) departing from the standards of the product of the present invention.

(Shape Management Performance Evaluation)

In other words, in the present example, first, as shape management performance evaluation, whether or not the base end portion serving as reference for height can be accurately confirmed when the shape of the projecting section 11 is optically read out to measure the height of the projecting section 11 was evaluated.

The luminous flux control members (product 1 of the present invention and conventional product 1') subjected to the shape management performance evaluation were formed by injection molding of a resin material using a mold. At this time, the width in the radial direction of the planar sections 12 in the product 1 of the present invention was formed to be 5 µm, which is the minimum in the standards of the product of the present invention. The conventional product 1' was formed without the planar sections 12. Furthermore, in the shape management performance evaluation, an existing laser microscope was used to read out the shape of the projecting section 11.

The results of the readout are as shown in FIG. 11.

In the product 1 of the present invention, based on the result of the readout of the shape of the projecting section 22, a base end portion P of the projecting section 11 serving as reference for the height of the projecting section 11 can be accurately confirmed, as shown in FIG. 11B. In other words, an inclining segment reflecting the inclined surfaces 111 and 112 of the projecting section 11 and a horizontal segment reflecting the planar section 12 appear in the graph of the readout result shown in FIG. 11B. A boundary point between the two segments can be easily determined as the peripheral end of the base end portion of the projecting section 11.

On the other hand, in the instance of the conventional product 1' that has no planar sections 12, the horizontal segment is not present, and only noise (steep falls and rises in the waveform) occurs in the peripheral end of the base end portion, as shown in FIG. 11A. Therefore, the peripheral end of the base end portion cannot be accurately confirmed.

According to results such as these, it is clear that shape management of the product 1 of the present invention is superior to that of the conventional product 1.

In addition, if the horizontal segment in the result of the readout of the shape of the projecting section 11 in FIG. 11B becomes any shorter, an accurate measurement result will be difficult to obtain in terms of shape management.

Therefore, the width of the planar sections 12 is preferably 5 µm or more.

(Optical Performance Evaluation)

Next, in the present example, as optical performance evaluation, light from the light source 2 was irradiated onto the irradiated surface 16 by the luminous flux control member (1, 1', and 1") and irradiated surface illuminance simulation for measuring illuminance distribution on the irradiated surface 16 was performed. Based on the results of the simulation, whether or not optical performance is maintained was evaluated.

In the irradiated surface illuminance simulation, the light source 2 was an LED having a light-emitting surface size of φ10 mm. The size of the luminous flux control member (1, 1', and 1") was φ10 mm, and the distance in the optical axis OA direction between the luminous flux control member (1, 1', and 1") and the irradiated surface 16 was 20 mm.

Simulation conditions such as these are conditions easily affecting the optical characteristics of the planar sections 12. The optical characteristics of the product 1 of the present invention being maintained under strict conditions such as this indicates that the product 1 of the present invention can be effectively applied to various uses.

In the irradiated surface illuminance simulation, the width in the radial direction of the planar sections 12 of the product 1 of the present invention was 10 µm. As the comparison product 1", that in which the width of the planar sections 12 is 50 µm and that in which the width is 100 µm were used.

Figure 14A:
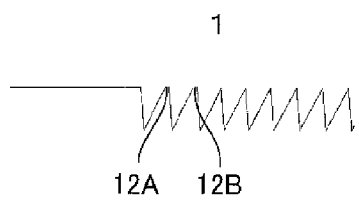
FIG. 14 shows a diagram of the results of irradiated surface illuminance simulation for a product of the present invention (FIG. 14B), together with a corresponding projecting section shape (FIG. 14A), in the example of the present invention.
Figure 14B:
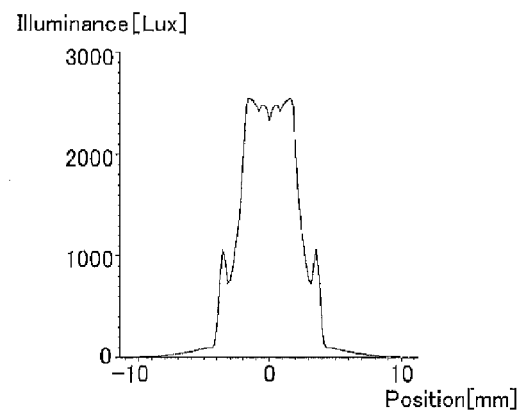
Figure 15A:
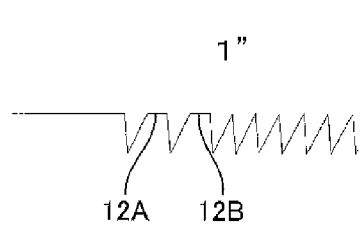
FIG. 15 shows a diagram of the results of irradiated surface illuminance simulation for a first comparison product (FIG. 15B), together with a corresponding projecting section shape (FIG. 15A), in the example of the present invention.
Figure 15B:
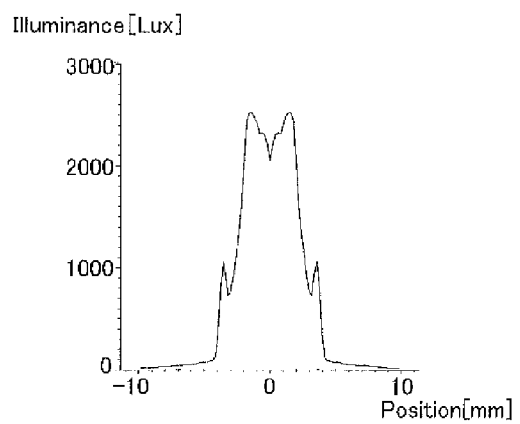
Figures 16A, 16B:
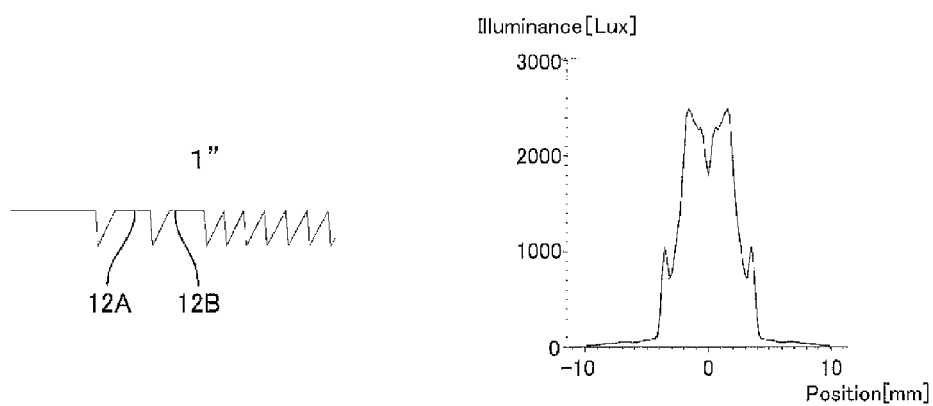
FIG. 16 shows a diagram of the results of irradiated surface illuminance simulation for a second comparison product (FIG. 16B), together with a corresponding projecting section shape (FIG. 16A), in the example of the present invention.

Under conditions such as these, the results of the irradiated surface illuminance simulation are as shown in the illuminance graphs in FIG. 13 to FIG. 16. FIG. 13 is the simulation results for the conventional product 1'. FIG. 14 is the simulation results for the product 1 of the present invention. FIG. 15 is the simulation results for a first comparison product 1" in which the width of the planar sections 12 is 50 μm. FIG. 16 is the simulation results for a second comparison product 1" in which the width of the planar sections 12 is 100 μm. In each drawing, the horizontal axis of the graph indicates distance [mm] in the radial direction with the intersection with the optical axis OA as the point of origin on the irradiated surface 16, and the vertical axis indicates illuminance (lx) in a position corresponding with the horizontal axis on the irradiated surface 16.

Here, in the simulation results of the conventional product 1' (FIG. 13B), the illuminance (values on the vertical axis) is almost even over a predetermined range from the center (the point of origin on the horizontal axis) of the irradiated surface 16 to the periphery, indicating the most favorable characteristics in the present simulation results. However, because the above-described shape management performance evaluation was poor, the conventional product 1' cannot achieve the object of the present application.

On the other hand, in the simulation results of the product 1 of the present invention (FIG. 14B), although the illuminance slightly decreases in the center of the irradiated surface 16, the illuminance variation causes no problems in actual use and favorable optical characteristics are indicated. In addition, because the width of the planar sections 12 of the product 1 of the present invention is greater than that of the luminous flux control member 1 (in which the width of the planar sections 12 is 5 μm) that has been evaluated as being favorable in the above-described shape management performance evaluation, the shape management performance evaluation is, of course, favorable.

On the other hand, in the simulation results of the comparison product 1" (FIG. 15B and FIG. 16B), the decrease in illuminance in the center of the irradiated surface 16 is significant, indicating illuminance variation that is unallowable in practical use.

Next, based on the above-described simulation results, the difference between the maximum value and the minimum value (values in the center section) at the peak of the illuminance distribution of the luminance flux control member (1, 1', and 1") was determined, as shown in Table 1 below, to enable quantitative understanding of the differences in optical characteristics among the luminance flux control members (1, 1', and 1"). Furthermore, based on the difference, an illuminance characteristics graph in relation to the width of the planar sections 12 was compiled as shown in FIG. 17.

TABLE 1

| Maximum value control member | Width of the planar section (μm) | Maximum value of the luminance (lx) | Minimum value of the luminance (lx) | Minimum value/Maximum value of the luminance (%) |
|---|---|---|---|---|
| Conventional product | Nothing | 256 | 242 | 95 |
| Product of the present invention | 10 | 255 | 235 | 92 |
| Comparison example 1 | 50 | 250 | 205 | 82 |
| Comparison example 2 | 100 | 250 | 180 | 72 |

Figure 17:
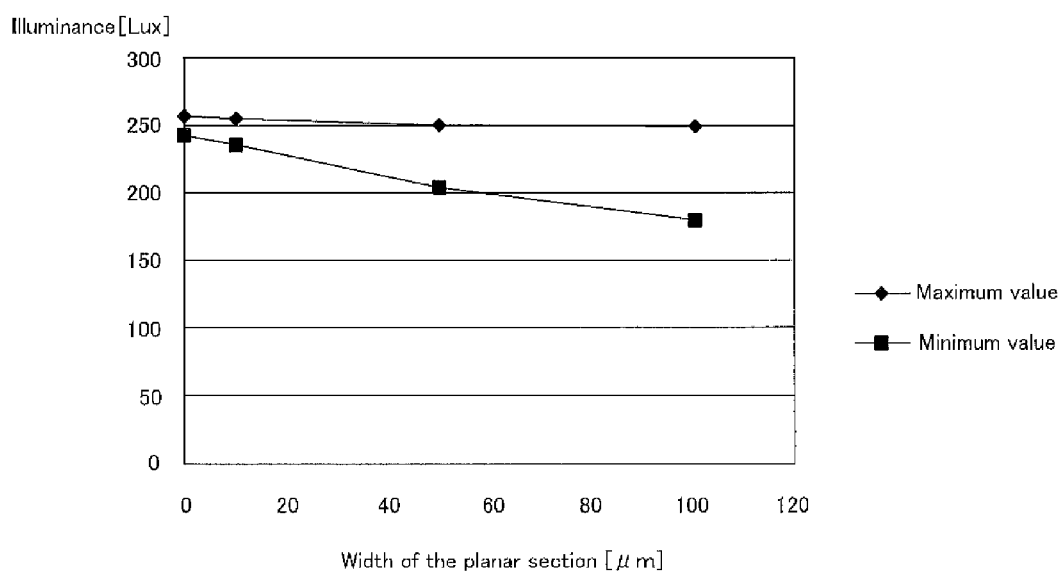
FIG. 17 is a graph showing illuminance characteristics of the irradiated surface in the example of the present invention.

As shown in Table 1 and FIG. 17, in the product 1 of the present invention, the decrease in the center section at the peak of the illuminance distribution can be kept to about 15%, whereas, in the comparison example 1", the decrease in illuminance becomes near 20% or near 30%.

Based on performance evaluations such as these, it is clear that the product 1 of the present invention is the most favorable from the perspective of both shape management and optical characteristics.

As described above, in the present invention, the planar sections 12 are, in principle, restrictively disposed in positions coming into contact internally or externally with the peripheral end of the base end portion of the first specific projecting section 11 (SP1) disposed on the inner side in the radial direction. As a result, shape management of the projecting sections 11 including the total reflection surfaces 112 can be performed in a simple, efficient, and inexpensive manner, with minimal sacrifice of optical characteristics.

According to the above-described embodiment, an instance is described in which the projecting sections 11 on the inner side in the radial direction have a sharper tip portion than the projecting sections 11 on the outer side in the radial direction. However, in unique specifications, an instance can be assumed in which the projecting sections 11 disposed on the outer side in the radial direction are also formed having a sharp angle similar to those of the projecting sections 11 disposed on the inner side in the radial direction. In such instances as well, as a result of the first specific projecting section 11 (SP1) being formed in the inner area, among the three areas (inner area, intermediate area, and peripheral area) to which the plurality of projecting sections 11 are classified for each position in the radial direction, effects similar to those according to the above-described embodiment can be achieved. Furthermore, as a result of the second specific projecting section 11 (SP2) being formed in the peripheral area, in a manner similar to that according to the above-described embodiment, an effect can be achieved in which the measurement accuracy of the height of the projecting section 11 can be improved. In both instances, deterioration of the optical characteristics can be minimized, and therefore, the planar sections 12 are not formed in the intermediate area.

The present invention is not limited to the above-described embodiment. Various modifications can be made without compromising the characteristics of the present invention.

The invention claimed is:

1. A luminous flux control member that controls traveling direction of light emitted from a light source, the luminous flux control member comprising:
   an incident area on which light emitted from the light source is incident;
   an emission area that emits light that has entered the incident area; and
   a plurality of projecting sections that are formed in the incident area, have a concentric circular ring shape of which the center is an optical axis when viewed from the optical axis direction, and are arrayed in a radial direction such as to form a serrated shape in a cross-section including the optical axis, wherein
   the projecting sections are formed such that a first surface disposed on the inner side in the radial direction has a smaller angle in relation to the optical axis than a second surface disposed on the outer side in the radial direction,
   the second surface functions as a total reflection surface that totally reflects the light that has reached the second surface from the light source in a predetermined traveling direction,
   when the plurality of projecting sections are classified into an inner area, an intermediate area, and a peripheral area for each position in the radial direction, a first specific projecting section disposed in the inner area is configured such that a planar section that is used to measure the height of the first specific projecting section and is perpendicular to the optical axis is connected to an inner peripheral end of a base end portion and an outer peripheral end of the base end portion of the first specific projecting section, and the projecting sections other than the first specific projecting section, among the plurality of projecting sections, are, in principle, disposed such as to come into contact internally or externally with another projecting section other than the first specific projecting section.

2. The luminous flux control member according to claim 1, wherein the first specific projecting section is a projecting section adjacent, on the outer side in the radial direction, to a projecting section disposed furthest inward in the radial direction.

3. The luminous flux control member according to claim 1, wherein a second specific projecting section disposed in the peripheral area, among the projecting sections other than the first specific projecting section, is configured such that, as an exception, a planar section that is used to measure the height of the second specific projecting section and is perpendicular to the optical axis is connected to the inner peripheral end of the base end portion and the outer peripheral end of the base end portion of the second specific projecting section.

4. The luminous flux control member according to claim 3, wherein the second specific projecting section is a projecting section disposed furthest outward in the radial direction.

5. The luminous flux control member according to claim 1, wherein the planar section is formed such that the width in the radial direction is 5 μm or more and less than 20 μm.

6. A light-emitting apparatus comprising:
a luminous flux control member according to claim 1; and
a light source according to claim 1 that is disposed opposing the incident area of the luminance flux control member.

7. The luminous flux control member according to claim 2, wherein the planar section is formed such that the width in the radial direction is 5 μm or more and less than 20 μm.

8. The luminous flux control member according to claim 3, wherein the planar section is formed such that the width in the radial direction is 5 μm or more and less than 20 μm.

9. The luminous flux control member according to claim 4, wherein the planar section is formed such that the width in the radial direction is 5 μm or more and less than 20 μm.

* * * * *